(12) United States Patent
Leem

(10) Patent No.: US 9,112,542 B2
(45) Date of Patent: Aug. 18, 2015

(54) WIRELESS POWER REPEATER

(71) Applicant: LG INNOTEK CO., LTD., Seoul (KR)

(72) Inventor: Sung Hyun Leem, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 369 days.

(21) Appl. No.: 13/630,338

(22) Filed: Sep. 28, 2012

(65) Prior Publication Data

US 2013/0088089 A1    Apr. 11, 2013

(30) Foreign Application Priority Data

Oct. 11, 2011 (KR) .................. 10-2011-0103820

(51) Int. Cl.
*H04B 5/00* (2006.01)

(52) U.S. Cl.
CPC ............ *H04B 5/0037* (2013.01); *H04B 5/0081* (2013.01)

(58) Field of Classification Search
CPC ................... H04B 5/0037; H04B 5/0081
USPC ........................................ 307/104; 250/515.1
See application file for complete search history.

(56) References Cited

U.S. PATENT DOCUMENTS

| | | | |
|---|---|---|---|
| 3,801,792 A * | 4/1974 | Lin | 250/398 |
| 6,249,006 B1 * | 6/2001 | Sakiyama | 250/505.1 |
| 2008/0266748 A1 | 10/2008 | Lee | |
| 2010/0065352 A1 * | 3/2010 | Ichikawa | 180/65.8 |
| 2011/0057606 A1 | 3/2011 | Saunamäki | |
| 2011/0175455 A1 | 7/2011 | Hashiguchi | |
| 2012/0126631 A1 | 5/2012 | Amma et al. | |
| 2012/0153731 A9 | 6/2012 | Kirby et al. | |
| 2012/0242447 A1 | 9/2012 | Ichikawa | |

FOREIGN PATENT DOCUMENTS

| | | |
|---|---|---|
| CN | 10-1023600 A | 8/2007 |
| CN | 10-2130511 A | 7/2011 |
| EP | 2256895 A1 | 12/2010 |
| EP | 2282590 A2 | 2/2011 |
| JP | 2001-093761 A | 4/2001 |
| JP | 2010-087353 | 4/2010 |
| JP | 2010-098861 | 4/2010 |
| JP | 2011-010472 A | 1/2011 |
| JP | 2010-098807 | 8/2011 |
| JP | 2011-151989 A | 8/2011 |
| KR | 10-2011-0014642 A | 2/2011 |

(Continued)

OTHER PUBLICATIONS

Office Action dated May 19, 2014, in Chinese Application No. 201210385028.2.
Office Action dated Dec. 24, 2013 in Chinese Application No. 2012-224750.
Notice of Allowance dated Jun. 27, 2013 in Korean Application No. 10-2011-0103820, filed Oct. 11, 2011.

(Continued)

*Primary Examiner* — Jared Fureman
*Assistant Examiner* — Rafael Pacheco
(74) *Attorney, Agent, or Firm* — Saliwanchik, Lloyd & Eisenschenk

(57) ABSTRACT

A wireless power repeater for transferring power from a wireless power transmitter to a wireless power receiver according to the embodiment includes a repeater resonant unit resonance-coupled with the wireless power transmitter for transferring the received power to the wireless power receiver, and a first shielding unit having a shape to be transformed according to pressure applied to the wireless power repeater for adjusting an amount of a magnetic field transferred from the repeater resonant unit to the wireless power receiver.

16 Claims, 6 Drawing Sheets

(a)

(b)

(56) References Cited

FOREIGN PATENT DOCUMENTS

| KR | 10-2011-0072074 A | 6/2011 |
|----|-------------------|--------|
| WO | WO-2008/050260 A1 | 5/2008 |
| WO | WO-2011-074091 | 6/2011 |

OTHER PUBLICATIONS

European Search Report dated Feb. 4, 2013 in European Application No. 12186777.4.

* cited by examiner

WIRELESS POWER REPEATER

CROSS-REFERENCE TO RELATED APPLICATION

This application claims the benefit under 35 U.S.C. §119 of Korean Patent Application No. 10-2011-0103820, filed Oct. 11, 2011, which is hereby incorporated by reference in its entirety.

BACKGROUND

The disclosure relates to a wireless power repeater.

A wireless power transmission or a wireless energy transfer refers to a technology of wirelessly transferring electric energy to desired devices. In the 1800's, an electric motor or a transformer employing the principle of electromagnetic induction has been extensively used and then a method for transmitting electrical energy by irradiating electromagnetic waves, such as radio waves or lasers, has been suggested. Actually, electrical toothbrushes or electrical razors, which are frequently used in daily life, are charged based on the principle of electromagnetic induction. Until now, the long-distance transmission using the magnetic induction, the resonance and the short-wavelength radio frequency has been used as the wireless energy transfer scheme.

Recently, among wireless power transmitting technologies, an energy transmitting scheme using resonance has been widely used.

Since an electric signal generated between the wireless power transmitter (or wireless power repeater) and the wireless power receiver is wirelessly transferred through coils in a wireless power transmitting system using resonance, a user may easily charge electronic appliances such as a portable device.

However, the wireless power transmitter (or wireless power repeater) generates a magnetic field even in a location where the wireless power receiver is not placed so that efficiency of power transmission is reduced.

Further, in the wireless power transmitting scheme using resonance, a magnetic field generated from a transmission side (or repeating side) may exert a bad influence upon human health.

BRIEF SUMMARY

The embodiment provides a wireless power repeater capable of increasing power transmission efficiency between the wireless power repeater and a wireless power receiver and minimizing generation of a magnetic field harmful to a human body.

According to the embodiment, there is provided a wireless power repeater for transferring power from a wireless power transmitter to a wireless power receiver. The wireless power repeater includes a repeater resonant unit resonance-coupled with the wireless power transmitter for transferring the received power to the wireless power receiver; and a first shielding unit having a shape to be transformed according to pressure applied to the wireless power repeater for adjusting an amount of a magnetic field transferred from the repeater resonant unit to the wireless power receiver.

According to the embodiment, there is provided wireless power repeater for transferring power from a wireless power transmitter to a wireless power receiver. The wireless power repeater includes a plurality of repeating units which are arranged adjacent to each other, wherein at least one of the repeating units includes: a repeater resonant unit resonance-coupled with the wireless power transmitter for transferring the received power to the wireless power receiver; and a first shielding unit having a shape to be transformed according to pressure applied to the wireless power repeater for adjusting an amount of a magnetic field transferred from the repeater resonant unit to the wireless power receiver.

According to the embodiments, following effects can be achieved.

First, power transmission efficiency can be improved by transforming a structure of the wireless power repeater.

Second, a bad influence upon human health can be reduced by partially shielding a magnetic field generated from a transmitting unit or repeating unit.

DETAILED DESCRIPTION

Figure 1:
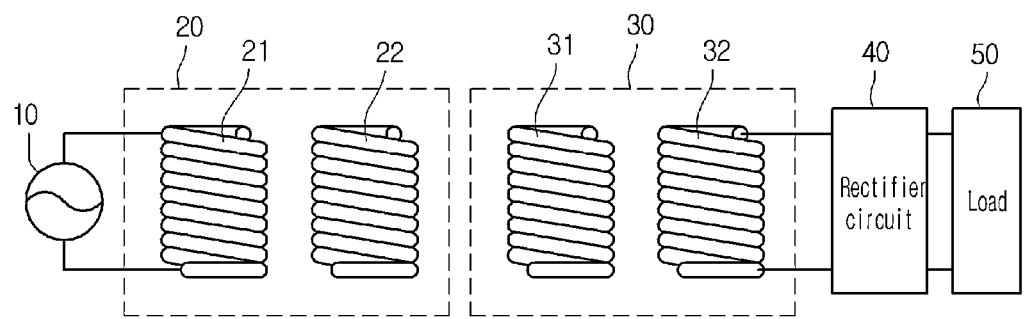
FIG. 1 is a diagram illustrating a wireless power transmission system according to an embodiment.

Terms and words used in the specification and the claims shall not be interpreted as commonly-used dictionary meanings, but shall be interpreted as to be relevant to the technical scope of the invention based on the fact that the inventor may property define the concept of the terms to explain the invention in best ways.

Therefore, the embodiments and the configurations depicted in the drawings are illustrative purposes only and do not represent all technical scopes of the embodiments, so it should be understood that various equivalents and modifications may exist at the time of filing this application.

FIG. 1 illustrates a wireless power transmission system according to an embodiment.

The power generated from a power source 10 is provided to a transmitting unit 20, such that the power is transferred by resonance to the receiving unit 30 which is resonant with the transmitting unit 20, that is, which has the same resonant frequency value as that of the transmitting unit 20. The power transferred to a receiving unit 30 is transferred via a rectifier circuit 40 to a load 50. The load 50 may be a battery or a predetermined apparatus which needs power.

In detail, the power source 10 is an AC power source for supplying AC power of a predetermined frequency.

The transmitting unit 20 includes a transmitting coil 21 and a transmission resonant coil 22. The transmitting coil 21 is connected to the power source 10, such that an AC current flows through the transmitting coil 21. When an AC current flows through the transmitting coil 21, an AC current is induced to the transmission resonant coil 22 physically spaced apart from the transmitting coil 21 due to electromagnetic induction. The power transferred to the transmission resonant coil 22 is transmitted by resonance to the receiving unit 30 which forms a resonance circuit with the transmitting unit 20.

Power may be transferred using resonance between two LC circuits which are impedance-matched with each other. The power transfer using resonance is able to transfer power at higher efficiency to a longer distance than those by electromagnetic induction.

The receiving unit 30 includes a reception resonant coil 31 and a receiving coil 32. The power transmitted through the transmission resonant coil 22 is received at the reception resonant coil 31, so that alternating current flows through the reception resonant coil 31. The power transferred to the reception resonant coil 31 is transferred to the receiving coil 32 by electromagnetic induction. The power transferred to the receiving coil 32 is rectified through the rectifier circuit 40 and transferred to the load 50.

Figure 2:
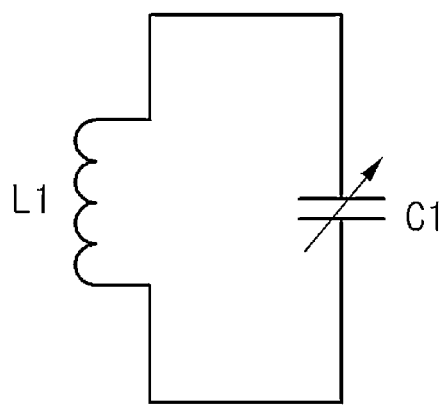
FIG. 2 is a circuit diagram showing an equivalent circuit of a transmission induction coil according to an embodiment.

FIG. 2 is an equivalent circuit diagram of the transmitting coil 21 according to the embodiment. As shown in FIG. 2, the transmitting coil 21 may include an inductor L1 and a capacitor C1, and form a circuit having a suitable inductance value and a suitable capacitance value. The capacitor C1 may be a variable capacitor. The transmitting unit 20 may control the variable capacitor, such that the transmitting unit 20 may perform an impedance matching. Meanwhile, equivalent circuits of the transmission resonant coil 22, the reception resonance coil 31, and the receiving coil 32 may be equal to that depicted in FIG. 2.

Figure 3:
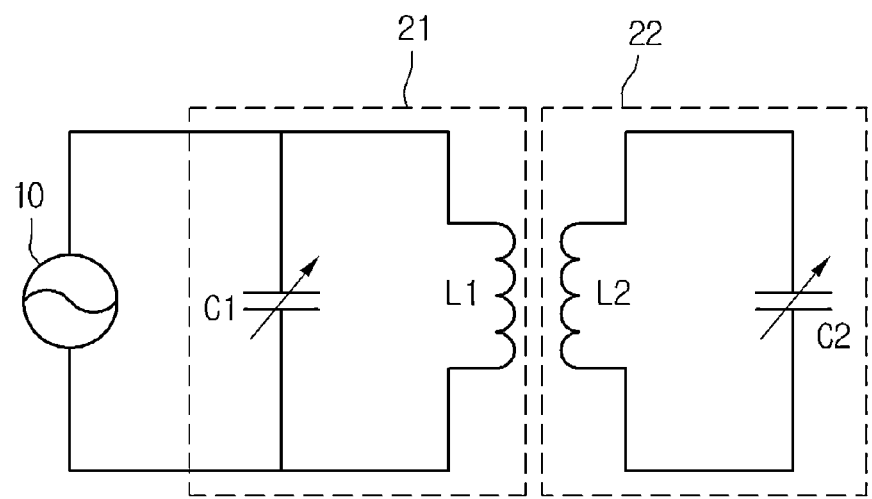
FIG. 3 is a circuit diagram showing an equivalent circuit of a power source and a transmitting unit according to an embodiment.

FIG. 3 is an equivalent circuit diagram of the power source 10 and the transmitting unit 20 according to the embodiment. As shown in FIG. 3, each of the transmitting coil 21 and the transmission resonant coil 22 may include an inductor L1 or L2 and a capacitor C1 or C2.

Figure 4:
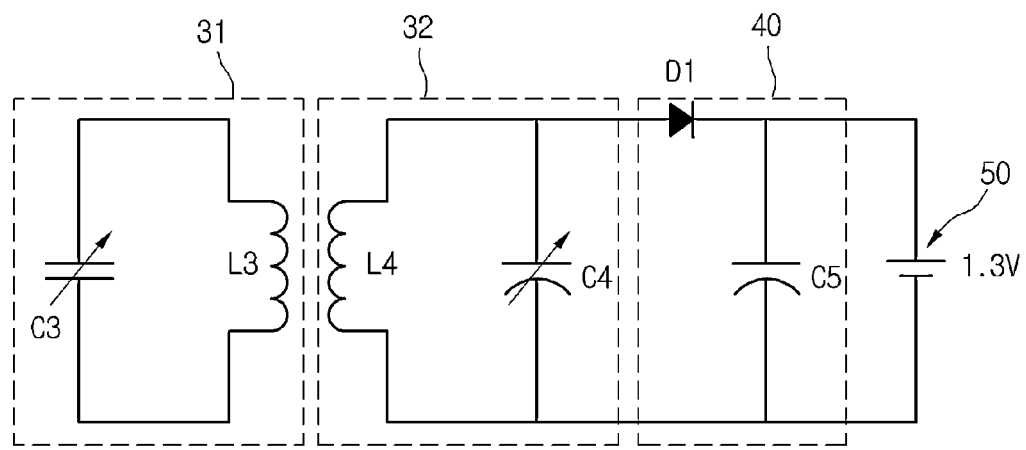
FIG. 4 is a circuit diagram showing an equivalent circuit of a reception resonant coil, a reception induction coil, a rectifier circuit, and a load according to an embodiment.

FIG. 4 is an equivalent circuit diagram of the reception resonance coil 31, the receiving coil 32, the rectifier circuit 40 and the load 50 according to the embodiment.

As shown in FIG. 4, each of the transmission resonant coil 31 and the receiving coil 32 may include an inductor L3 or L4 and a capacitor C3 or C4 having predetermined inductance value and predetermined capacitance value. The rectifier circuit 40 may include a diode D1 and a rectifying capacitor C5 such that the rectifier circuit 40 converts alternating current (AC) power into direct current (DC) power and outputs the DC power. Although the load 50 is denoted as 1.3 V DC power, the load 50 may be a battery or other devices requiring DC power.

Figure 5:
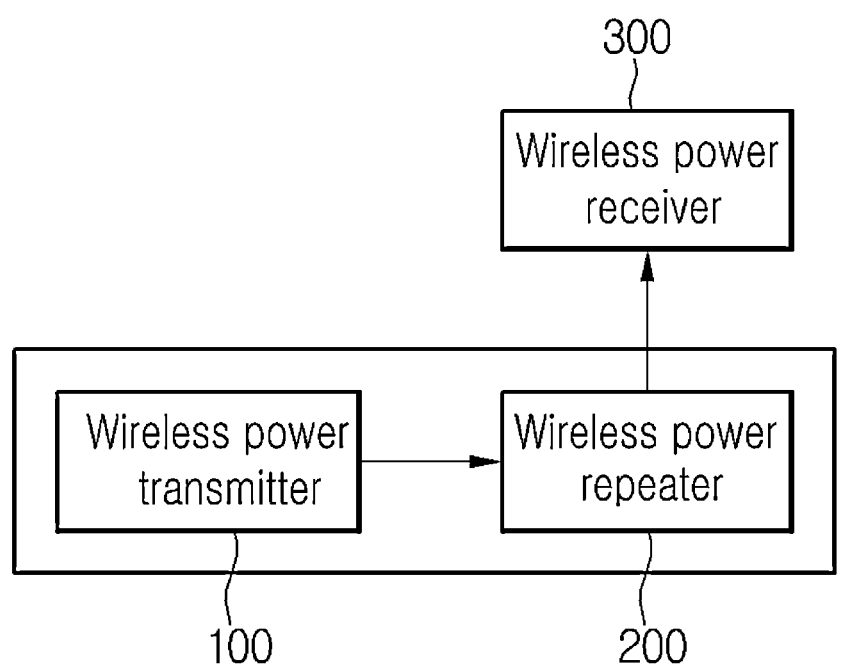
FIG. 5 is a block diagram illustrating a wireless power transmission system according to an embodiment.
Figure 6:
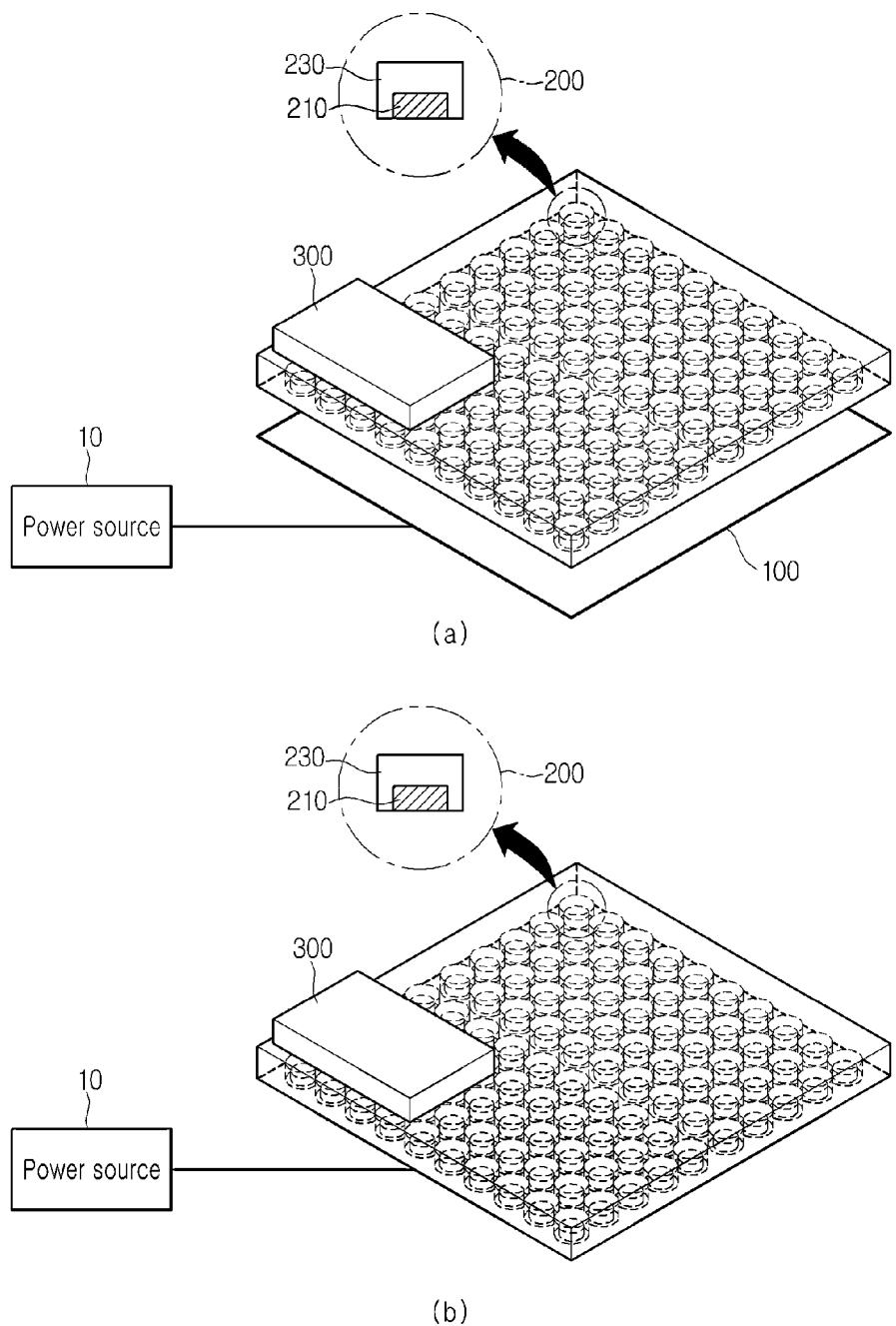
FIG. 6 is a diagram illustrating configuration examples of the wireless power transmission system according to an embodiment.

FIG. 5 is a view illustrating an example of a structure of a wireless power transmission system according to an embodiment. FIG. 6 is a diagram illustrating first and second example configuration of the wireless power transmission system according to an embodiment.

Referring to FIG. 5, the wireless power transmission system include a wireless power transmitter 100 and a wireless power repeater 200, and transfers power to the wireless power receiver 300 through the wireless power repeater 200.

The wireless power transmitter 100 may include a transmitting coil and a transmission resonant coil. The transmitting coil is connected to an AC power supply which is connected to the outside, and AC current from the AC power supply flows through the transmitting coil. When the AC current flows through the transmitting coil, the AC current is induced by electromagnetic induction to the transmission resonant coil physically spaced apart from the transmitting coil. The power transferred to the transmission resonant coil is transferred to the wireless power repeater 200 constituting a resonant circuit with the wireless power transmitter 100 by resonance. That is, the wireless power transmitter 100 receives power from the AC power supply connected to the outside and is coupled with the transmission resonant coil and transfers the received power to the wireless power repeater 200 in a non-radial scheme.

The wireless power repeater 200 may transmit the power received from the wireless power transmitter 100 to the wireless power receiver 300. The transmitting procedure of the power from the wireless power repeater 200 to the wireless power receiver 300 may be the same as the transmitting procedure between the wireless power transmitter 100 and the wireless power repeater 200.

The repeater resonant unit 70 performs a function of receiving power from the wireless power transmitter 100 and transferring the power using resonance to the wireless power receiver 300.

FIG. 6 is a diagram illustrating configuration examples of the wireless power transmission system according to an embodiment.

Referring to FIG. 6(a), a plurality of wireless power repeaters 200 may be sequentially arranged on a substrate. A least one of the wireless power repeaters 200 may include a repeating unit 210 and a first shielding unit 230.

A shape of the repeating unit 210 is transformed by pressure applied to a top side of the wireless power repeater 200 so that an amount of a magnetic field transferred from the repeating unit 210 to the wireless power receiver 300 and an amount of the magnetic field to be leaked to the outside may be adjusted.

If the wireless power receiver 300 is located on top sides of wireless power repeaters 200, shapes of the wireless power repeaters, to which pressures is applied by the wireless power receiver 300, are compressively transformed. The compressively transformed wireless power repeaters 200 may be transformed to a structure which efficiently shields the magnetic field generated from the repeating unit 210.

The wireless power receiver 300 may be mounted on an electronic device such as a mouse, a portable phone, or a remote controller located on a wireless power repeater. The wireless power receiver 300 includes a rectifier circuit for using the power received from the wireless power repeater 200 by rectifying the power.

FIG. 6(b) is a configuration example of a wireless power transmission system illustrating an embodiment in which the wireless power repeater 200 substitutes for the wireless power transmitter 100.

The wireless power repeater 200 does not receive power by resonance from a separate wireless power transmitter 100 but receives power through the power source 10.

The wireless power repeater 200 transmits the received power to the wireless power receiver 300. Other operations of the wireless power repeater 200 are the same as illustrated above.

Figure 7:
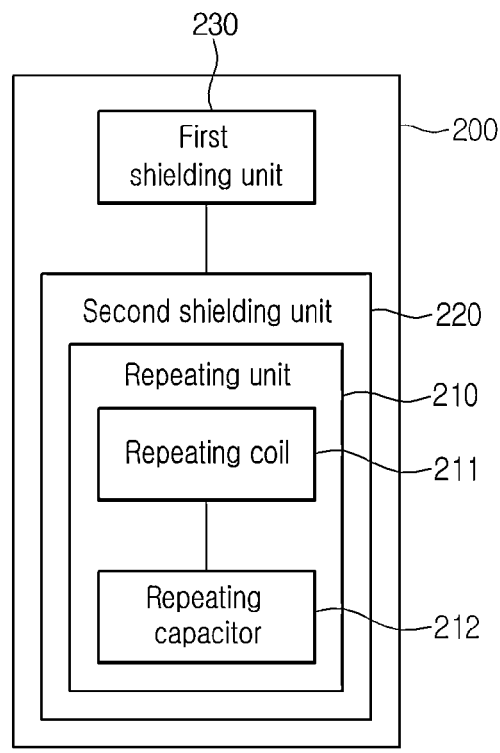
FIG. 7 is a block diagram illustrating a wireless power repeater according to an embodiment.

FIG. 7 is a block diagram illustrating a wireless power repeater according to an embodiment. The wireless repeater 200 includes a repeating unit 210 and a first shielding unit 230.

The repeating unit 210 includes a repeating coil 211 and a repeating capacitor 212.

The repeating unit 210 may transmit the power received from the wireless power transmitter 100 to the wireless power receiver 300. The repeating coil 211 receives the power through resonance with the transmission resonant coil of the wireless power transmitter 100.

A shape of the first shielding unit 230 is transformed by pressure applied to a top side of the wireless power repeater 200 so that an amount of a magnetic field transferred to the wireless power receiver 300 and an amount of the magnetic field to be leaked to the outside may be adjusted.

A shape of the first shielding unit 230 may be transformed according to pressure applied to a top side of the wireless power repeater 200 so that a direction of a magnetic field generated from the repeating unit 210 may be changed. That is, the shape of the first shielding unit 230 may be transformed according to pressure applied to a top side of the wireless power repeater 200. If the shape of the first shielding unit 230 is transformed, the first shielding unit 230 changes a direction of a magnetic field generated from the repeating unit 210 so that an amount of the magnetic field to be leaked to locations except for the wireless power receiver 300 may be reduced, which will be described later in detail with reference to FIGS. 8 to 10.

The first shielding unit 230 may have a cylindrical spring structure or a conical spring structure.

When pressure is applied to a top side of the wireless power repeater 200, as the first shielding unit 230 is compressively transformed, an amount of a magnetic field transferred to the wireless power receiver 300 may be increased as compared with a case where pressure is not applied to the top side of the wireless power repeater 200, which will be described in detail with reference to FIGS. 8 to 10 later.

Pressure is applied to the top side of the wireless power repeater 200 in the case that the wireless power receiver 300 is located on the top side of the wireless power repeater 200.

When the pressure is not applied to the top side of the wireless power repeater 200, the first shielding unit 230 may be relaxedly transformed to shield the magnetic field generated from the repeating unit 210.

The wireless power repeater 200 may further include a second shielding unit 220.

The second shielding unit 220 is connected to the first shielding unit 230, and may have a shape receiving the repeating unit 210 or have one of a cylindrical shape or a hexahedral shape. However, the embodiment is not limited to the above. That is, the second shielding unit 220 may have various shapes if it can receive the repeating unit 210.

The first shielding unit 230 and the second shielding unit 220 may include a ferrite for shielding a magnetic field generated from the repeating unit 210.

Figure 8:
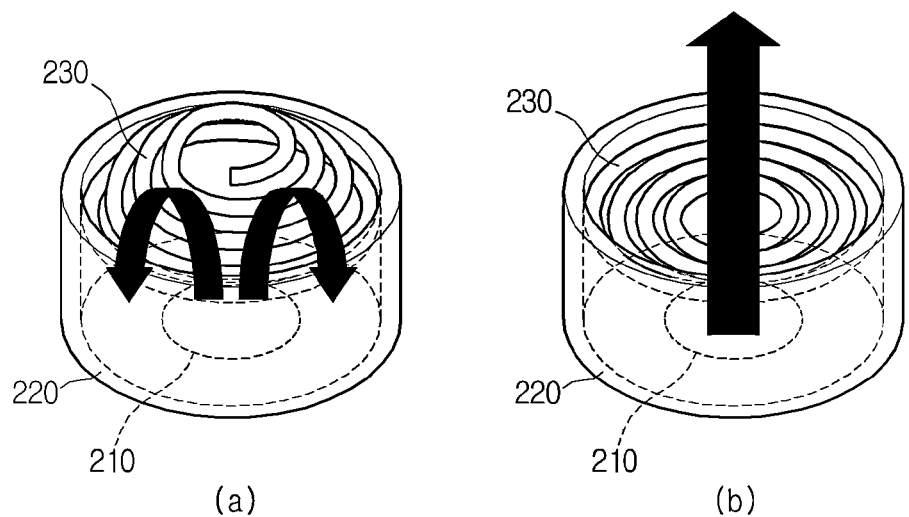
FIG. 8 is a diagram illustrating a configuration of a wireless power repeater according to a first embodiment.

FIG. 8 is a diagram illustrating a configuration of a wireless power repeater according to a first embodiment.

The wireless power repeater 200 includes a repeating unit 210, a first shielding unit 230, and a second shielding unit 220.

Referring to FIGS. 8(a) and (b), the first shielding unit 230 has a conical spring structure, and the second shielding unit 220 is connected to the first shielding unit 230 and has a cylindrical shape receiving the repeating unit 210. An arrow direction of FIG. 8 refers to a direction in which a magnetic field is formed, and a thickness of the arrow refers to intensity of the magnetic field.

FIG. 8(a) illustrates a state that pressure is not applied to a top side of the wireless power repeater 200, which illustrates a structure of the wireless power repeater 200 in a state that the wireless power receiver 300 is not placed on the wireless power repeater 200. As the first shielding unit 230 is relaxedly transformed to have a relaxedly transformed structure, the first shielding unit 230 may partially shield a magnetic field directed toward upper, left, and right sides among the magnetic fields generated from the repeating unit 210 as indicated by a magnetic flux line shown in FIG. 8(a). That is, when the wireless power receiver 300 is not located on the top side of the wireless power repeater 200, as the first shielding unit 230 has a relaxedly transformed structure, the first shielding unit 230 may change a direction of the magnetic field generated from the repeating unit 210 to reduce an amount of the magnetic field to be leaked to the outside. If the amount of the magnetic field to be leaked to the outside is reduced, the magnetic field applied to a human body may be reduced.

The second shielding unit 230 may shield a magnetic field directed toward left and right sides among the magnetic field generated from the repeating unit 210.

As described above, when the wireless power receiver 300 is not placed on the top side of the wireless power repeater 200, the wireless power repeater 200 may efficiently shield the magnetic field generated from the repeating unit 210, thereby protecting the human body.

FIG. 8(b) illustrates a state that pressure is applied to the top side of the wireless power repeater 200, which illustrates a structure of the wireless power repeater 200 in a state that the wireless power receiver 300 is placed on the wireless power repeater 200. As the first shielding unit 230 is compressively transformed to have a compressively transformed structure, a winding interval of the first shielding unit 230 having a spring structure may be dense. Referring to a magnetic flux line shown in FIG. 8(b), as compared with the magnetic flux line of FIG. 8(a), a magnetic field generated from the repeating unit 210 is directed upwards in a state that intensity of the magnetic field is increased.

Accordingly, the repeating unit 210 may concentratedly transfer a magnetic field to the wireless power receiver 300 so that efficient power transmission is possible. Simultaneously, the wireless power repeater 200 may shield the magnetic field to be leaked to left and right sides of the wireless power repeater 200 through a first compressively transformed shielding unit 230 and the second cylindrical shielding unit 220.

Figure 9:
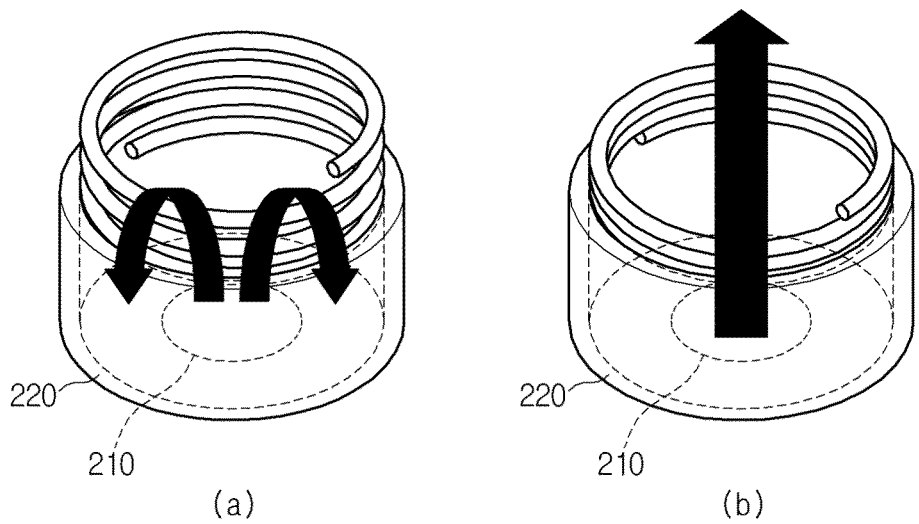
FIG. 9 is a diagram illustrating a configuration of a wireless power repeater according to a second embodiment.

FIG. 9 is a diagram illustrating a configuration of a wireless power repeater according to a second embodiment.

The wireless power repeater 200 includes a repeating unit 210, a first shielding unit 230, and a second shielding unit 220.

Referring to FIGS. 9(a) and (b), the first shielding unit 230 has a cylindrical spring structure, and the second shielding unit 220 is connected to the first shielding unit 230 and has a cylindrical shape receiving the repeating unit 210. An arrow direction of FIG. 8 refers to a direction of a magnetic field, and a thickness of the arrow refers to intensity of the magnetic field.

FIG. 9(a) illustrates a state that pressure is not applied to a top side of the wireless power repeater 200, which illustrates a structure of the wireless power repeater 200 in a state that the wireless power receiver 300 is not placed on the wireless power repeater 200. As the first shielding unit 230 is relaxedly transformed to have a relaxedly transformed structure, the first shielding unit 230 may shield a magnetic field directed toward upper, left, and right sides among the magnetic field generated from the repeating unit 210 as a magnetic flux line shown in FIG. 8(a). That is, when the wireless power receiver 300 is not located on the top side of the wireless power repeater 200, as the first shielding unit 230 has a relaxedly transformed structure, the first shielding unit 230 may change a direction of the magnetic field generated from the repeating unit 210 to reduce an amount of the magnetic field to be leaked to the outside.

The second shielding unit 230 may shield a magnetic field directed toward left and right sides among the magnetic field generated from the repeating unit 210.

As described above, when the wireless power receiver 300 is placed on the top side of the wireless power repeater 200, the wireless power repeater 200 may efficiently shield the magnetic field generated from the repeating unit 210 to inhibit the magnetic field from exerting bad influence upon the human body.

FIG. 9(b) illustrates a state that pressure is applied to the top side of the wireless power repeater 200, which illustrates a structure of the wireless power repeater 200 in a state that the wireless power receiver 300 is placed on the wireless power repeater 200. As the first shielding unit 230 is compressively transformed to have a compressively transformed structure, an interval of the first shielding unit 230 may be dense. Referring to a magnetic flux line shown in FIG. 9(b), as compared with the magnetic flux line of FIG. 9(a), a magnetic field generated from the repeating unit 210 is directed upward in a state that intensity of the magnetic field is increased.

Accordingly, the repeating unit 210 may concentratedly transfer a magnetic field to the wireless power receiver 300 so that efficient power transmission is possible. Simultaneously, the wireless power repeater 200 may shield the magnetic field to be leaked to left and right sides of the wireless power repeater 200 through a first compressively transformed shielding unit 230 and the second cylindrical shielding unit 220.

Figure 10:
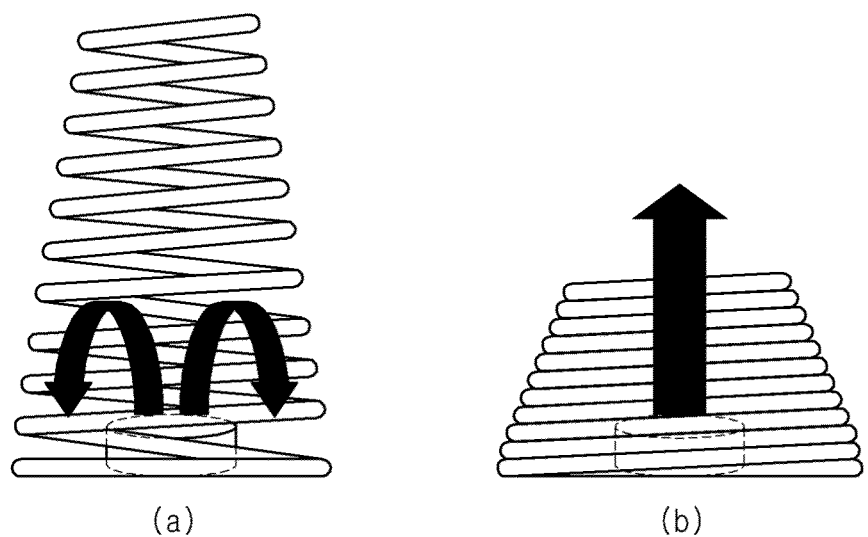
FIG. 10 is a diagram illustrating a configuration of a wireless power repeater according to a third embodiment.

FIG. 10 is a diagram illustrating a configuration of a wireless power repeater according to a third embodiment.

The wireless power repeater 200 includes a repeating unit 210 and a first shielding unit 230.

Referring to FIGS. 10(a) and (b), the first shielding unit 230 has a conical spring structure and has a shape receiving the repeating unit 210. An arrow direction of FIG. 10 refers to a direction of a magnetic field, and a thickness of the arrow refers to intensity of the magnetic field. Unlike the wireless power repeater of FIG. 8, the wireless power repeater 200 according to the third embodiment of the present invention does not include a second shielding unit 220 but include only the first shielding unit 230, and the first shielding unit 230 has a shape receiving the repeating unit 210.

FIG. 10(a) illustrates a state that pressure is not applied to a top side of the wireless power repeater 200, which illustrates a structure of the wireless power repeater 200 in a state that the wireless power receiver 300 is not placed on the wireless power repeater 200. As the first shielding unit 230 is relaxedly transformed to have a relaxedly transformed structure, the first shielding unit 230 may shield a magnetic field directed toward upper, left, and right sides among the magnetic field generated from the repeating unit 210 as a magnetic flux line shown in FIG. 10(a).

As described above, when the wireless power receiver 300 is placed on the top side of the wireless power repeater 200, the wireless power repeater 200 may efficiently shield the magnetic field generated from the repeating unit 210, thereby protecting the human body.

FIG. 10(b) illustrates a state that pressure is applied to the top side of the wireless power repeater 200, which illustrates a structure of the wireless power repeater 200 in a state that the wireless power receiver 300 is placed on the wireless power repeater 200. As the first shielding unit 230 is compressively transformed to have a compressively transformed structure, an interval of the first shielding unit 230 may be dense. Referring to a magnetic flux line shown in FIG. 10(b), as compared with the magnetic flux line of FIG. 10(a), a magnetic field generated from the repeating unit 210 is directed upward in a state that intensity of the magnetic field is increased.

Accordingly, the repeating unit 210 may concentratedly transfer a magnetic field to the wireless power receiver 300 so that efficient power transmission is possible. Simultaneously, the wireless power repeater 200 may shield the magnetic field to be leaked to the outside through a first compressively transformed shielding unit 230.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

It will be apparent to those skilled in the art that various modifications and variations can be made in the present invention. Thus, it is intended that the present invention covers the modifications and variations of this invention provided they come within the scope of the appended claims and their equivalents.

Therefore, the embodiments and the configurations depicted in the drawings are illustrative purposes only and do not represent all technical scopes of the embodiments, so it should be understood that various equivalents and modifications may exist at the time of filing this application.

What is claimed is:

1. A wireless power repeater for transferring power from a wireless power transmitter to a wireless power receiver, the wireless power repeater comprising:
    a repeater resonant unit resonance-coupled with the wireless power transmitter for transferring received power to the wireless power receiver;
    a first shielding unit configured such that, when pressure is applied to the wireless power repeater, a shape of the first shielding unit transforms and an amount of a magnetic field transferred from the repeater resonant unit to the wireless power receiver is adjusted; and
    a second shielding unit connected to the first shielding unit and having a shape for receiving the repeater resonant unit;
    wherein, when the shape of the first shielding unit is transformed applied to the wireless power repeater, an amount of the magnetic field transferred to the wireless power receiver and an amount of the magnetic field leaked to an outside is adjusted.

2. The wireless power repeater of claim 1, wherein the first shielding unit is configured such that, when pressure is applied to a top side of the wireless power repeater, a shape of the first shielding unit transforms and an amount of a magnetic field transferred from the repeater resonant unit to the wireless power receiver is adjusted.

3. The wireless power repeater of claim 2, wherein, when the pressure is applied to the top side of the wireless power repeater, the first shielding unit is compressively transformed so the amount of the magnetic field transferred to the wireless power receiver is increased as compared with a case where the pressure is not applied to the top side of the wireless power repeater.

4. The wireless power repeater of claim 2, wherein, when the pressure is not applied to the top side of the wireless power repeater, the first shielding unit is relaxedly transformed to adjust the amount of the magnetic field to be leaked to an outside.

5. The wireless power repeater of claim 4, wherein the first shielding unit is relaxedly transformed to change a direction of the magnetic field generated from the repeater resonant unit so that the amount of the magnetic field to be leaked to the outside is adjusted.

6. The wireless power repeater of claim 1, wherein the first shielding unit has a cylindrical spring structure or a conical spring structure.

7. The wireless power repeater of claim 1, wherein the second shielding unit has one of a cylindrical shape and a hexahedral shape.

8. The wireless power repeater of claim 1, wherein the first and second shielding units comprise a ferrite.

9. A wireless power repeater for transferring power from a wireless power transmitter to a wireless power receiver, the wireless power repeater comprising:
- a plurality of repeating units which are arranged adjacent to each other,
- wherein at least one of the repeating units comprises:
- a repeater resonant unit resonance-coupled with the wireless power transmitter for transferring received power to the wireless power receiver; and
- a first shielding unit configured such that, when pressure is applied to the wireless power repeater, a shape of the first shielding unit transforms and an amount of a magnetic field transferred from the repeater resonant unit to the wireless power receiver is adjusted; and
- a second shielding unit connected to the first shielding unit and having a shape for receiving the repeater resonant unit;
- wherein, when the shape of the first shielding unit is transformed by pressure applied to the wireless power repeater, an amount of the magnetic field transferred to the wireless power receiver and an amount of the magnetic field leaked to an outside is adjusted.

10. The wireless power repeater of claim 9, wherein the first shielding unit is configured such that when pressure is applied to a top side of the wireless power repeater, a shape of the first shielding unit transforms and an amount of a magnetic field transferred from the repeater resonant unit to the wireless power receiver is adjusted.

11. The wireless power repeater of claim 10, wherein, when the pressure is applied to the top side of the wireless power repeater, the first shielding unit is compressively transformed so the amount of the magnetic field transferred to the wireless power receiver is increased as compared with a case where the pressure is not applied to the top side of the wireless power repeater.

12. The wireless power repeater of claim 10, wherein, when the pressure is not applied to the top side of the wireless power repeater, the first shielding unit is relaxedly transformed to adjust the amount of the magnetic field to be leaked to an outside.

13. The wireless power repeater of claim 12, wherein the first shielding unit is relaxedly transformed to change a direction of the magnetic field generated from the repeater resonant unit so that the amount of the magnetic field to be leaked to the outside is adjusted.

14. The wireless power repeater of claim 9, wherein the first shielding unit has a cylindrical spring structure or a conical spring structure.

15. The wireless power repeater of claim 9, wherein the second shielding unit has one of a cylindrical shape and a hexahedral shape.

16. The wireless power repeater of claim 15, wherein the first and second shielding units comprise a ferrite.

* * * * *